US012374044B2

(12) United States Patent
Sagàs et al.

(10) Patent No.: US 12,374,044 B2
(45) Date of Patent: Jul. 29, 2025

(54) CREATION AND USE OF DIGITAL HUMANS

(71) Applicant: Hyperreal Digital Inc., Sanford, NC (US)

(72) Inventors: Sergi Sagàs, Barcelona (ES); Xavi Rodriguez, Tarragona (ES); Remington Scott, New Hope, PA (US); Doyal Bryant, Charlotte, NC (US); Chris Travers, New York, NY (US)

(73) Assignee: Hyperreal Digital Inc., Sanford, NC (US)

( * ) Notice: Subject to any disclaimer, the term of this patent is extended or adjusted under 35 U.S.C. 154(b) by 4 days.

(21) Appl. No.: 17/955,642

(22) Filed: Sep. 29, 2022

(65) Prior Publication Data

US 2023/0101254 A1    Mar. 30, 2023

Related U.S. Application Data

(60) Provisional application No. 63/250,682, filed on Sep. 30, 2021.

(51) Int. Cl.

| | |
|---|---|
| *G06T 15/00* | (2011.01) |
| *G06F 16/51* | (2019.01) |
| *G06F 21/60* | (2013.01) |
| *G06T 15/04* | (2011.01) |
| *G06T 17/20* | (2006.01) |
| *H04N 23/60* | (2023.01) |

(52) U.S. Cl.
CPC .............. *G06T 17/20* (2013.01); *G06F 16/51* (2019.01); *G06F 21/602* (2013.01); *G06T 15/04* (2013.01); *H04N 23/64* (2023.01)

(58) Field of Classification Search
CPC ......... G06T 19/00; G06T 17/20; G06T 17/00; G06T 15/10; G06T 15/00; G06T 13/40; G06T 15/06; G06T 15/08; G06T 15/20; G06T 15/04; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06F 16/51; G06F 21/602; H04N 23/64; H04N 23/90; G06V 20/20
USPC ........................................................ 345/419
See application file for complete search history.

(56) References Cited

U.S. PATENT DOCUMENTS

| | | | | |
|---|---|---|---|---|
| 6,757,445 | B1* | 6/2004 | Knopp ................... | G01C 11/06 382/296 |
| 2007/0070069 | A1* | 3/2007 | Samarasekera ......... | G06F 3/011 707/E17.013 |
| 2020/0005544 | A1* | 1/2020 | Kim ........................ | G06T 13/40 |
| 2021/0106206 | A1* | 4/2021 | Yamane ............ | A61B 1/000095 |

(Continued)

*Primary Examiner* — Gordon G Liu
(74) *Attorney, Agent, or Firm* — Sheridan Ross P.C.

(57) ABSTRACT

The present disclosure provides, among other things, systems and methods for producing digital content in a time and memory-efficient manner. Among other things, the disclosed systems and methods enable a more efficient approach to (i) capturing image and metadata content of a subject, (ii) processing image and metadata content of a subject, (iii) storing data content of a subject, (iv) accessing and utilizing image content of a subject, (v) generating unique video content that includes a virtualization of the subject (e.g., a hyper model or virtual model) based on the stored image content of the subject, and/or (vi) securely limiting access to the image content of a subject.

19 Claims, 10 Drawing Sheets

(56) References Cited

U.S. PATENT DOCUMENTS

2021/0142497 A1\* 5/2021 Pugh ................... G06T 7/194
2021/0403004 A1\* 12/2021 Alvarez ................ H04W 4/40
2023/0419505 A1\* 12/2023 Tang .................... G06T 7/215

\* cited by examiner

CREATION AND USE OF DIGITAL HUMANS

CROSS REFERENCE TO RELATED APPLICATION

The present application claims the benefits of and priority, under 35 U.S.C. § 119(e), to U.S. Provisional Application No. 63/250,682 filed Sep. 30, 2021, by Sagas, et al and entitled "Creation and Use of Digital Humans" of which the entire disclosure is incorporated herein by reference for all purposes.

FIELD OF THE DISCLOSURE

Embodiments of the present disclosure relate generally to methods and systems for data processing and more particularly to generating images and other content.

BACKGROUND

Digital representations of subjects/talent (e.g., people), real or imagined, are standards of the virtual production industry as deployed in film, TV, and video games, and are now being deployed in a variety of entertainment and commercial environments. Additionally, commercial and entertainment media is becoming increasingly customized and targeted to individuals based on known data about them. Today, this is limited to textual variations of specific advertising, such as language or special offers, and some graphical elements. With the growth of realistic virtual production capabilities and the reduction in cost of production, there is a demand for delivering variations of what would be experienced as real people, with real products in real backgrounds, even though they were all digitally created. The net effect would be that producers and marketers would be able to target media that had specific appeals by regions (city v country), environment (beach v snow), ethnicity, gender, cuisine (meat v vegan), fashion and so forth. The assumption is that better targeting by connecting the actual media delivered to data about the user, generates more engagement and revenue. The ability to make the leap from text and image variations to full-scale realistic media is vastly challenging and requires new technologies in the creation of the virtual production elements, the way they can be combined on presentation platforms, and also the way they are integrated into delivery systems (ad and media servers).

Current human or subject scanning sessions are inefficient. In particular, most scanning sessions are confusing for the subject and often result in less than all required images of the subject to support the creation of a virtualization of the subject. Failure to capture all of the required images of the subject may occur if the subject is confused by the tedious and time-consuming directions being received during the capture of each image. In current image-capture pipelines, a large amount of data is generated, which creates difficulties related to image storage, organization, and processing. Furthermore, the centralized nature of the current processing tools requires costly computing infrastructure and imposes severe limitations in terms of storage and bandwidth. Hence, there is a need for improved methods and systems for capturing, processing, and storing images and using the stored images to create content.

BRIEF SUMMARY

Embodiments of the disclosure provide systems and methods for capturing, processing, and storing images and using the stored images to create content. According to one embodiment, a method for processing images can comprise presenting a set of instructions to a subject. The instructions can define movements and/or expressions for the subject to make and can be provided to the subject via an automated script that monitors the subject and proceeds from one instruction to a next instruction in response to detecting movements and/or expressions of the subject.

Images of the subject can be captured while the subject is reacting to the set of instructions. Capturing the images of the subject can comprise capturing a plurality of images of the subject are captured under varying lighting conditions. Capturing the images can also comprise simultaneously capturing RAW photometric data and RAW photogrammetry data of the subject while the subject is reacting to the set of instructions. The RAW photometric data can be processed by performing a color correction on the RAW photometric data, aligning the photometric data, generating one or more photometric normal, generating one or more photometric displacement maps, generating one or more digital models of the subject, and storing the one or more digital models of the subject. The RAW photogrammetry data can be processed by performing a color correction on the RAW photogrammetry data, generating RAW three-dimensional scan data, generating a mesh of the subject with the RAW three-dimensional scan data and a base mesh, generating a texture reprojection with the mesh of the subject, and generating a finished texture map of the subject based on the texture reprojection.

Metadata can be appended to the images as the images are captured. The metadata can substantially synchronize the images with the set of instructions. The images can be stored in a database and indexed according to the appended metadata. In some cases, the database can comprise a secure database. In such cases, storing the images in the secure database can further comprise encrypting the images and one or more models of the subject generated from the images, receiving a request to retrieve the images and one or more models of the subject, and performing authentication and authorization processes on the request. In response to successful completion of the authentication and authorization processes search criteria can be received for retrieving the images and one or more models of the subject. The secure database can be searched for the images and one or more models of the subject. The images and one or more models of the subject can be provided in response to the received search criteria. Usage of the images and one or more models of the subject can be tracked and the images and one or more models of the subject can be updated with any changes based on the tracking of the usage of the images and one or more models of the subject.

According to another embodiment, a system can comprise a camera configured to capture images of a subject during an image-capture session and two or more compute units. In some cases, at least one of the two or more compute units can be provided in the camera. Each compute unit can comprise a processor and a memory. The memory of each compute unit can store instructions which, when executed be the processor of the compute unit, causes the compute units to collectively process images captured by the camera in a distributed manner by presenting a set of instructions to a subject. The instructions can define movements and/or expressions for the subject to make and the images of the subject can be captured while the subject is reacting to the set of instructions. The instructions stored in the memory of the two or more compute units can further cause the processors to append metadata to the images as the images are captured, the metadata substantially synchronizing the images with the set of instructions, and storing the images in a database, wherein the images are indexed according to the appended metadata. In some cases, a first of the two or more compute units can process a first portion of an image of the subject taken at a first time and a second of the two or more compute units can process a second portion of the image of the subject taken at the first time.

In some cases, at least one of the two or more compute units can comprise an input optimizer and a process optimizer. The input optimizer can comprise an image analyzer and a feed multiplexer. The process optimizer can comprise a four-dimensional model reconstruction module. In some cases, at least one of the two or more compute units can comprise a physical compute unit and at least another of the two or more compute units can comprise a virtual compute unit. Additionally, or alternatively, each of the two or more compute units can be coordinated by a centralized controller. Outputs of the two or more compute units can additionally, or alternatively, be used to generate a digital model of the subject. In such cases, the digital model of the subject can comprise a three-dimensional model of the subject generated with images stored in an indexed manner and each of the two or more compute units can be configured to apply a common indexing to the images.

According to yet another embodiment, a non-transitory, computer-readable medium can comprise a set of instructions stored therein which, when executed by one or more processors of a distributed computing environment, causes the one or more processors to process images by presenting a set of instructions to a subject, the instructions defining movements and/or expressions for the subject to make and capturing images of the subject while the subject is reacting to the set of instructions. Capturing the images can comprise simultaneously capturing RAW photometric data and RAW photogrammetry data of the subject while the subject is reacting to the set of instructions and separately processing the RAW photometric data and the RAW photogrammetry data. Processing the RAW photometric data can comprise performing a color correction on the RAW photometric data, aligning the photometric data, generating one or more photometric normal, generating one or more photometric displacement maps, generating one or more digital models of the subject and storing the one or more digital models of the subject. Processing the RAW photogrammetry data can comprise performing a color correction on the RAW photogrammetry data, generating RAW three-dimensional scan data, generating a mesh of the subject with the RAW three-dimensional scan data and a base mesh, generating a texture reprojection with the mesh of the subject, and generating a finished texture map of the subject based on the texture reprojection.

The instructions executed by the processors of the distributed computing environment can further cause the processors to append metadata to the images as the images are captured, the metadata substantially synchronizing the images with the set of instructions, and store the images in a database, wherein the images are indexed according to the appended metadata.

Figure 1:
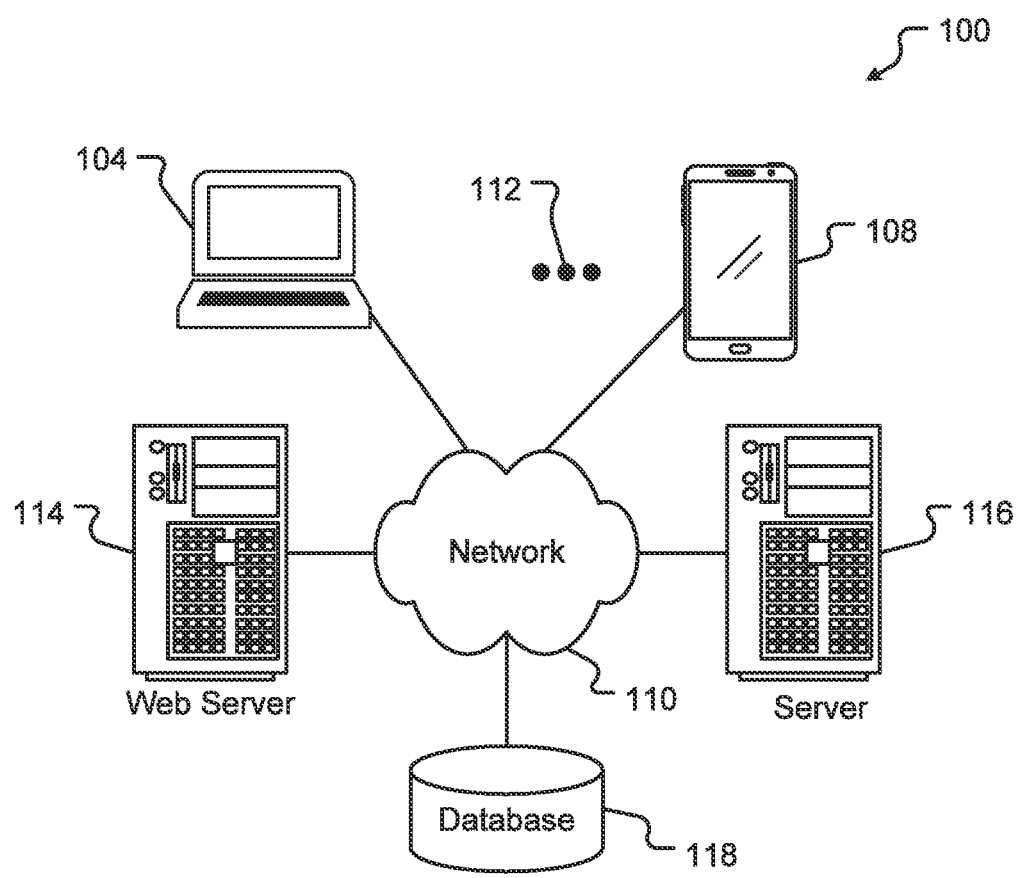
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 may be a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
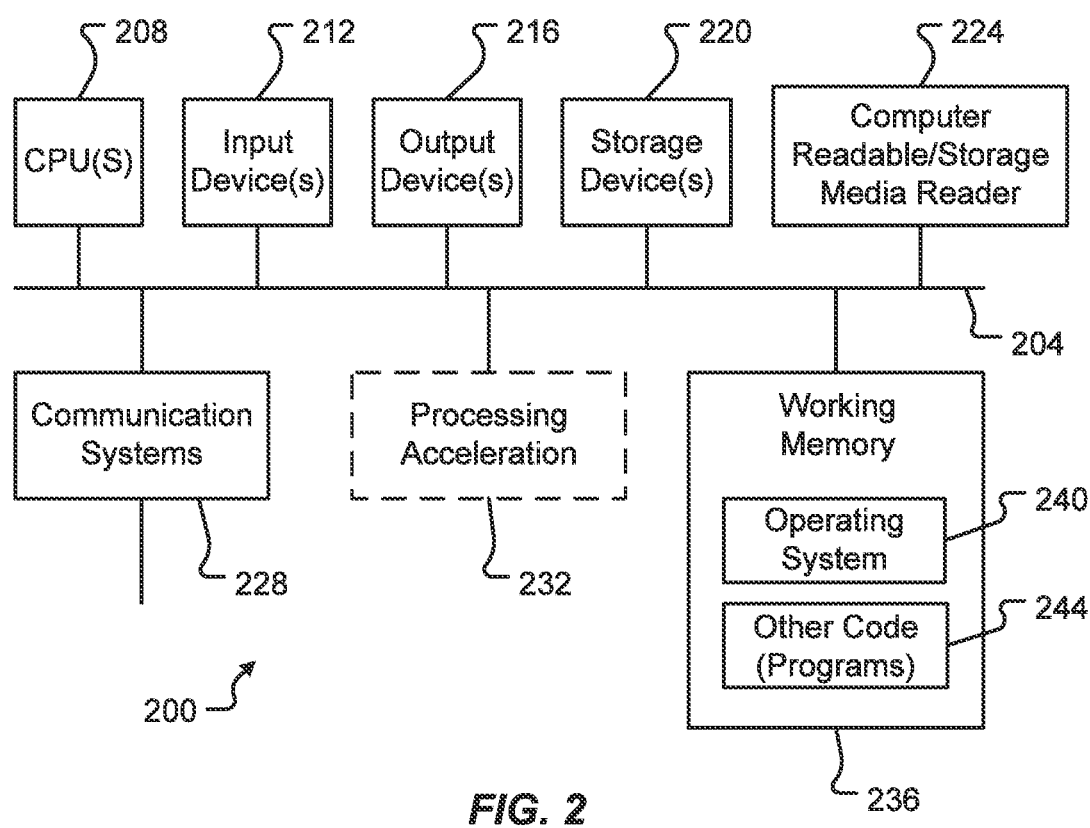
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The present disclosure provides, among other things, systems and methods for producing digital content in a time and memory-efficient manner. Among other things, the disclosed systems and methods enable a more efficient approach to (i) capturing image and metadata content of a subject, (ii) processing image and metadata content of a subject, (iii) storing data content of a subject, (iv) accessing and utilizing image content of a subject, (v) generating unique video content that includes a virtualization of the subject (e.g., a hyper model or virtual model) based on the stored image content of the subject, and/or (vi) securely limiting access to the image content of a subject.

Figure 3:
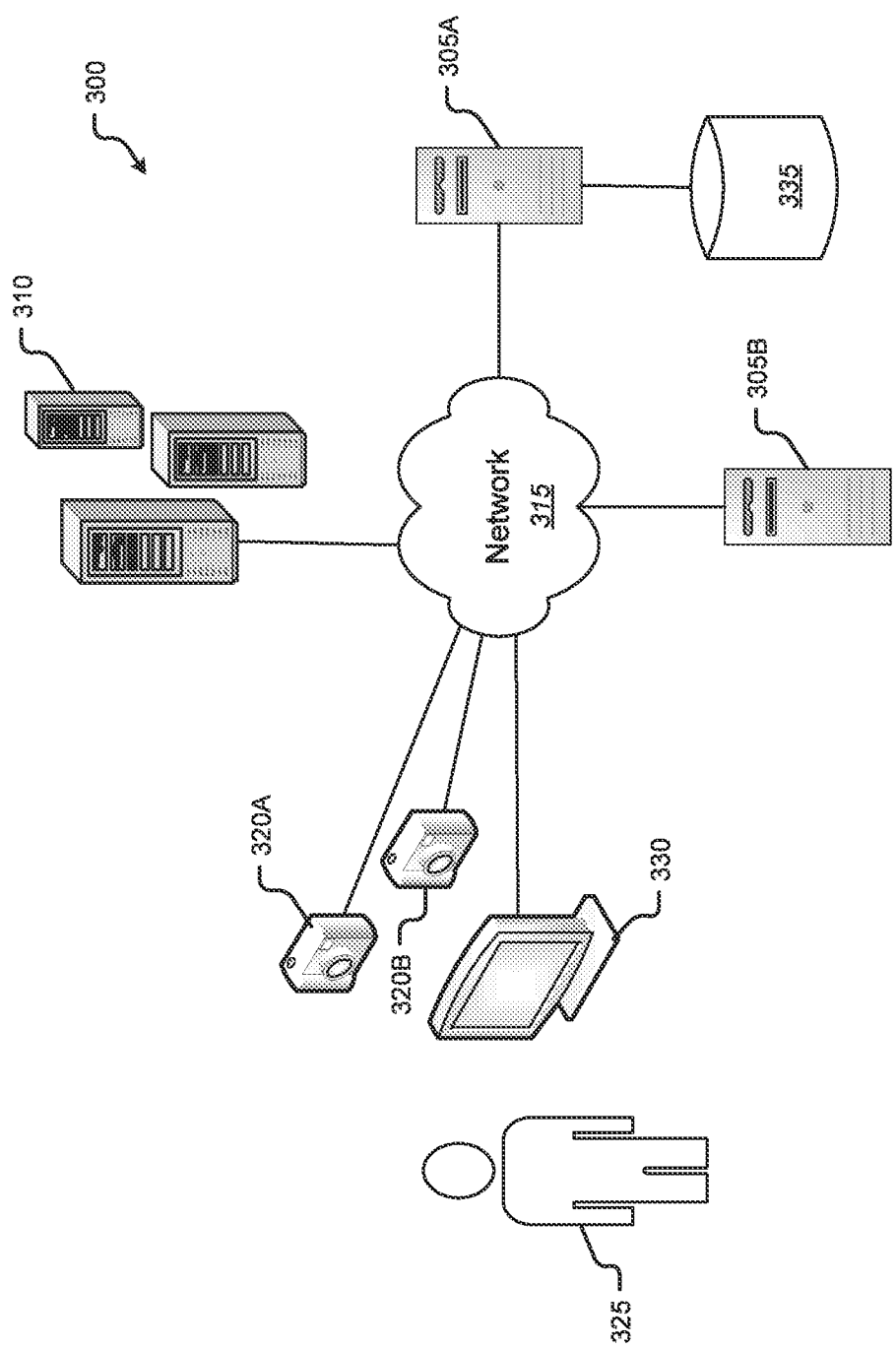
FIG. 3 is a block diagram illustrating an exemplary system for capturing, storing, and creating images according to one embodiment of the present disclosure.

FIG. 3 is a block diagram illustrating an exemplary system for capturing, storing, and creating images according to one embodiment of the present disclosure. More specifically, this example illustrates a distributed computing environment 300 comprising a number of compute units 305A, 305B, and 310 communicatively coupled with one or more networks 315. The compute units can comprise physical compute units 305A and 305B as well as cloud-based, virtual compute units 310. Both the physical compute 305A and 305B and the virtual compute units can comprise and/or be implemented on any of the servers and/or other computing devices as described above. The one or more networks 315 can comprise the Internet and/or any combination of wired or wireless, local or remote networks as described above.

According to one embodiment, one of the compute nodes 305A may operate as a central controller for capturing, processing, and storing image data as well as generating content from the stored image data. Accordingly, the distributed computing environment 300 can also include any number of cameras 320A and 320B and/or other sensors arranged to capture images of and other inputs from a subject 325. In some cases, these cameras 320A and 320B or other sensors can also comprise compute units providing some processing of captured images. During the capture process, instructions or directions can be provided to the subject 325 via a display and/or other output device(s) 330. These instructions can guide the subject through a predetermined set of poses, expressions, movements, etc. to be captured. Once captured and processed by the compute units 305A, 305B, and 310, image data can be saved by the central controller 305A in a secure, central database for later use to generate content.

Stated another way, embodiments of the present disclosure propose an improved image-capture pipeline. Illustratively, but without limitation, an improved image-capture pipeline is described that includes an improved coaching/directorial approach for instructing the subject 325, e.g., though output device(s) 330, for defined movements or expressions during image capture. The improved image-capture pipeline is also contemplated to utilize a distributed four-dimensional image processing system in which a combination of hardware and/or software are used, in a distributed fashion, to perform the image-processing functions traditionally performed in a centralized processing location. Embodiments of the present disclosure also contemplate the ability to perform a real-time simultaneous capture of photometrics and photogrammetry (four-dimensional or 4D) data using high-speed computational cameras 320A and 320B. In other words, the cameras 320A and 320B or image capture devices may include a combination of hardware and/or software that facilitates image capture as well as facilitating processing and storage of photometrics and photogrammetry data.

The disclosed hyper-scanning process may include, but is not limited to: clear and easy to follow instructions for the subject 325; a coaching audio and/or video crafted to guide the subject 325 in real-time during the capture session through an optimized list of the required facial expressions with audio and visual cues; remote and on-site procedures to gain efficiency and optimize the subject's 325 time and data collection; automated video editing/sorting/organizing tools based upon tags; audio signals and any other indexing and tagging devices and techniques; etc. Knowledge of the coaching video and the order in which certain expressions or movements will be performed can help index images in real-time.

The distributed computing environment 300 can include a combination of distributed hardware and software elements. As described above, the hardware can include distributed, low-cost compute units 305A and 305B, each with local storage on different locations, e.g., at cameras 320A and 320B, at peripheral devices, at network devices, etc. In addition to these networked physical compute units 305A and 305B, the distributed computing environment can also utilize virtual compute units 310 and other resources in the cloud for different processing, storage, and control tasks. The software can include, but is not limited to: an Artificial Intelligence (AI) based system that analyzes the images from each camera using a multitude of optimizing methodologies and determines what camera feed each module should access; per-camera distributed pre-processing; distributed processing software to efficiently compute photometrics and 4D photogrammetry; and/or others.

In some embodiments, indexed and organized images of a subject may be collected by the central controller 305A and stored in a centralized, secure database 335 which can be considered a digital human vault. The centralized, secure database 335 may provide a system that is capable of storing, securing, ensuring authenticity and integrity, classifying, disseminating, and tracking the digital copies and synthetic constructions of digital humans as well as the elements that comprise them. In some embodiments, access to the centralized, secure database 335 may be limited to authorized users that have paid for the rights to utilize the subject's likeness as part of a virtualization of the subject. The images stored in the centralized, secure database 335 may be organized in a manner that facilitates an efficient generation of the virtualization of the subject and the virtualizations may be restricted based on use restrictions, which can also be stored as metadata with the images.

It may be possible to generate highly-realistic virtualizations or digital representations of a subject. Such virtualizations or digital representations may be referred to herein as hyper-models as they reflect extreme detail of the subject—higher resolution than the eye can see, versus cartoonish characters that have also been named as avatars. In some embodiments, these hyper-models are bespoke creations for specific productions. The need, however, has become so vast and common, particularly for celebrities (e.g., actors, musicians, sports stars, social media influencers and politicians) that there is a demand for re-use in multiple "performances" over multiple platforms.

The centralized, secure database 335 can both be a secure storage system for these images and support a method for authorized end-users to search, select, contract and technically access the images or virtual models for use in their productions. The centralized, secure database 335 may represent a global casting platform for digital humans created by one or many different creators. Components of the centralized, secure database 335 may include, but are not limited to: data that stores the "digital DNA" of humans as comprising 3D imaging, motions, and vocal manners; ultra-high-resolution images captured of the subject's face and body; signature movements, such as the muscle movements of a smile or frown, and all aspects of full body movement using motion-capture technology; the subject's voice recorded and all aspects of pitch, tone, modulation; and/or others. These elements can then be built into a full multi-dimensional representation of the human that replicates their 3D appearance, motion and sound. The result can be considered a "universal digital human" and an immortal set of assets, that can be added to over time, or edited to be de-aged, blended with other attributes and so forth. The digital human can then be manipulated to appear, move and speak inside the various performance platforms that exist today or in the future.

The centralized, secure database 335 may be used to house the elements of the digital humans, and classify them for search & retrieval. Approved producers can be given key access to view available components and related information about them. This information may include, but is not limited to: name of digital human; ages available; looks available, e.g., hair, skin tones, make up, etc.; costumes available; motions or actions recorded, e.g., dancing, martial arts, singing etc.; demographic characteristics, e.g., for consumer interest, advertising, casting, etc.; opportunity preferences or exclusions; product exclusivities or exclusions; brand exclusivities; use history and performance statistics; management/agent contacts; contracts or contractual points; submission form for performance request; animations and examples of performance; text-to speech animations in environments; payment process; and/or others.

In some embodiments, dynamic content creation can be provided by the central controller 305A that enables a virtual production to be generated that includes at least one virtualization of a subject. Illustratively, the dynamic content creation can be achieved using images of the subject 325 stored in the centralized, secure database 335. The dynamic content creation may provide a process to render, in real-time or near-real-time, different elements of high-end virtual productions for targeted delivery of video and animations. As an example, the virtual productions may be used to create commercials and/or entertainment that includes a virtualization of the subject 325. It may also be possible to generate three-dimensional interactive environments that include a virtualization of a subject 325, e.g., a virtual avatar of the subject 325, a deep fake three-dimensional model of the subject, a four-dimensional model of the subject 325, etc.

Embodiments of the present disclosure provide a solution that leverages capabilities in creating "universal" virtual production elements—with an emphasis on the digital humans that look, move and sound real. These can be created in a precise manner that can be rendered in multiple production technologies, from video game engines to the those used for major motion pictures. Furthermore, they can be ready-built in three dimensions with controls for animation offline or in real-time on the appropriate display technologies.

A possible result is a set of elements that can be ready to be incorporated with potentially thousands of variations of output. Utilization of the centralized, secure database 335 and the dynamic content creation provides a collective platform to house and render these three-dimensional or four-dimensional models in near-real-time or actual real-time, and connect them to the demand-side engines that will deliver them to the consumers. These data-driven requests may be formulated by manual campaign segmentation design, or by what are automatic algorithms in what exists today as advertising's demand side platforms.

Figure 4:
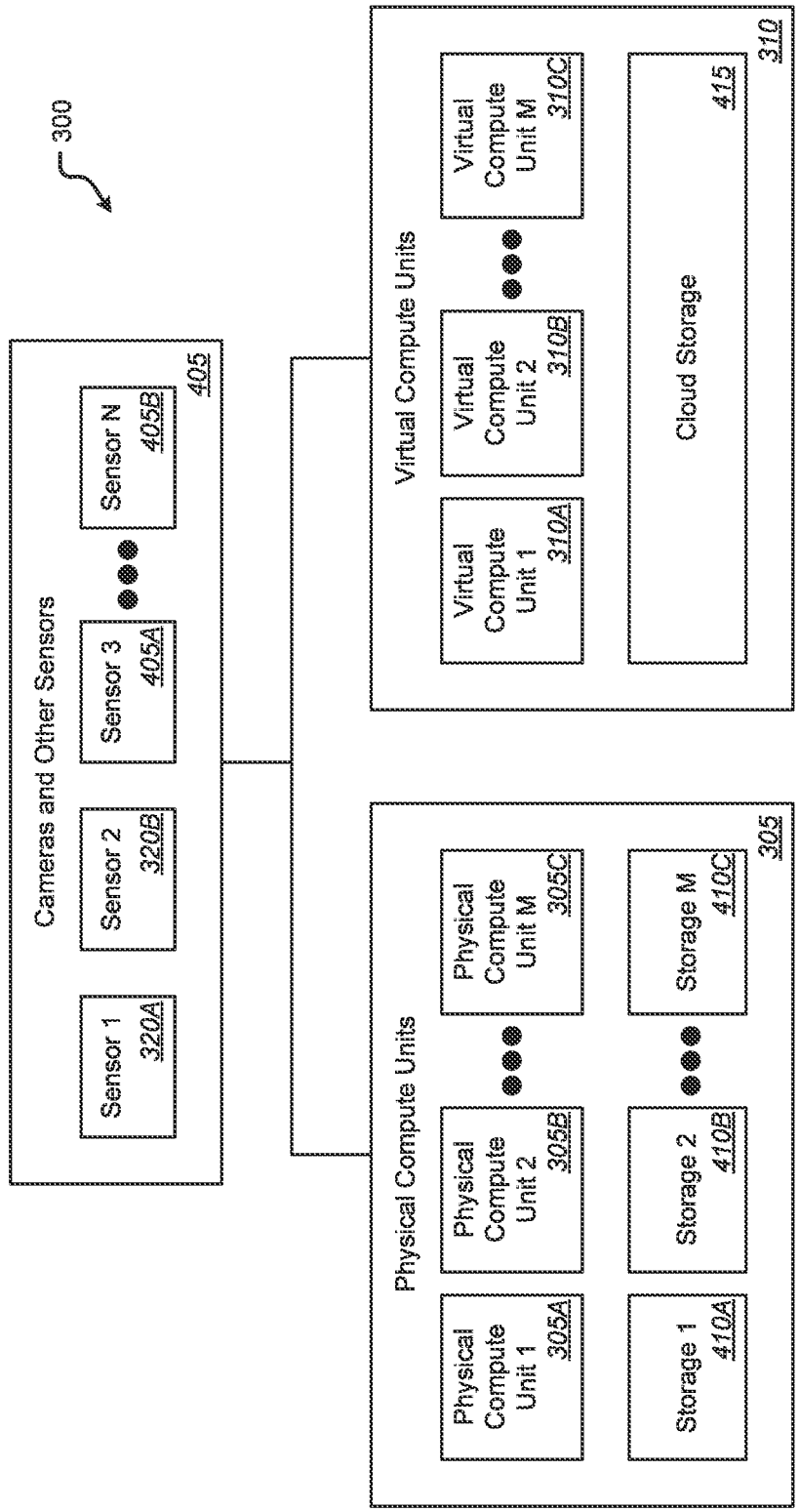
FIG. 4 is a block diagram illustrating exemplary sensors and compute units according to one embodiment of the present disclosure.

FIG. 4 is a block diagram illustrating exemplary sensors and compute units according to one embodiment of the present disclosure. More specifically, this example illustrates an additional view of the distributed computing environment 300 introduced above. As illustrated herein, a number of sensors 405 include cameras 320A and 320B as introduced above as well as other sensors such as microphones etc. can be couple with physical compute units 305 as well as virtual compute units 310. Each physical compute unit 305A, 305B, and 305C may have an associated local storage 410A, 410B, and 410C. Each virtual compute unit 310A, 310B, and 310C can utilize a local or remote cloud storage. It should be noted that any number of sensors 405 can be coupled with any number of physical compute units 305 and/or virtual compute units 310.

Figure 5:
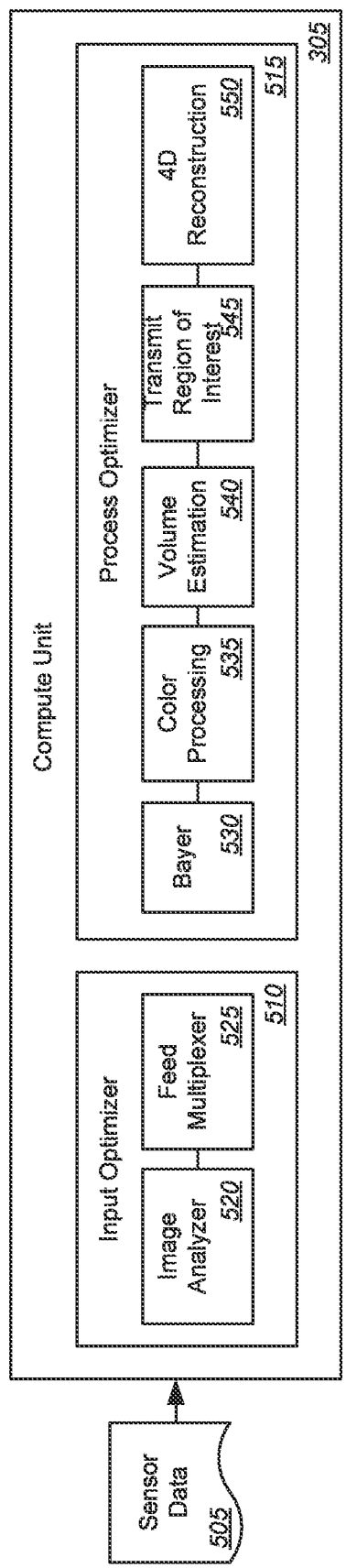
FIG. 5 is a block diagram illustrating additional details of an exemplary compute unit according to one embodiment of the present disclosure.

FIG. 5 is a block diagram illustrating additional details of an exemplary compute unit according to one embodiment of the present disclosure. As illustrated in this example, a compute unit can comprise an input optimizer 510 and a process optimizer 515. The input optimizer 520 can comprise an image analyzer 520 and a feed multiplexer 525. Generally speaking, the input optimizer 520 can condition sensor data 505 from the sensors 405 can the multiplexer 525 can combine two or more of these signals for further processing.

The process optimizer 515 can comprise a Bayer module 530, a color processing module 535, a volume estimation module 540, a region of interest transmission module 545, and four-dimensional model reconstruction module 550. Generally speaking, the Bayer module 530 can apply a Bayer filter to image data as known in the art. Also as known in the art, the color processing module 535 can apply color correction, white balance correction, and similar adjustments. The volume estimation module 540 can determine a volume of a three-dimensional object represented in a set of images using various known methods. The region of interest transmission module 545 can select a reference location for further processing. The four-dimensional model reconstruction module 550 can utilize collected and processed image data to build one or more models of an individual as will be described further below.

Figure 6:
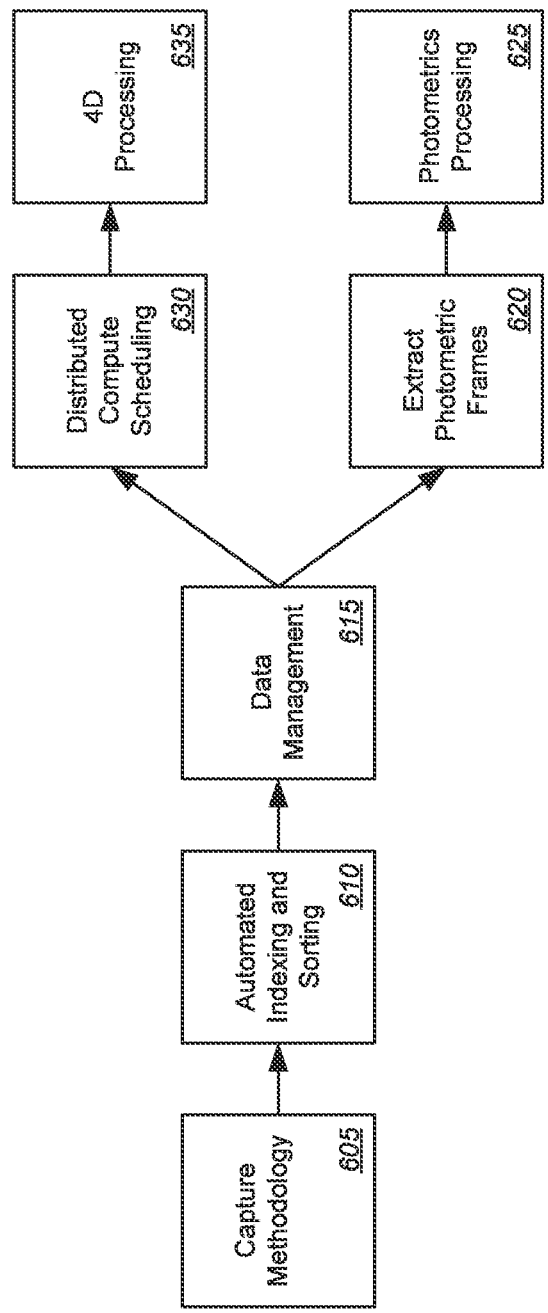
FIG. 6 is a block diagram illustrating an exemplary image capture pipeline according to one embodiment of the present disclosure.

FIG. 6 is a block diagram illustrating an exemplary image capture pipeline according to one embodiment of the present disclosure. Generally speaking, this pipeline 600 represents a sequence of processes that may be performed within a distributed computing environment as described above to capture, process, and store image data. As illustrated here, the pipeline begins with a capture methodology process 605 that can include presenting a set of instructions to a subject 325 that define or describe movements and/or expressions for the subject to make while a set of images of the subject 325 in various lighting conditions are collected.

The automated indexing and sorting processes 610 of the pipeline 600 can tag each collected image with metadata that correlates the collected image to the pose, expression, movement, etc. intended to be captured. This metadata can then be used to sort and index the collected images.

The data management processes 615 can store and manage the sorted and indexed image data in a database such as the centralized, secure database 335 described above. The stored data can include both RAW photometric data and RAW photogrammetry data. At this point, the pipeline bifurcates into processing of each of the RAW photometric data and RAW photogrammetry data separate.

The RAW photometric data can be processed by a photometric frame extraction process 620. The photometric frame extraction process 620 can determine or estimate three dimensional measurements for the subject from the image data as known in the art. Photometrics processing 625 can then be applied to generate one or more models of the subject 325.

The RAW photogrammetry data can be distributed across compute units by a distributed compute scheduling process 630 as known in the art. The distributed RAW photogrammetry data can then undergo four-dimensional processing 635. The four-dimensional processing 635 will can use the RAW photogrammetry data to generate one or more texture maps for the models of the subject 325.

Figure 7:
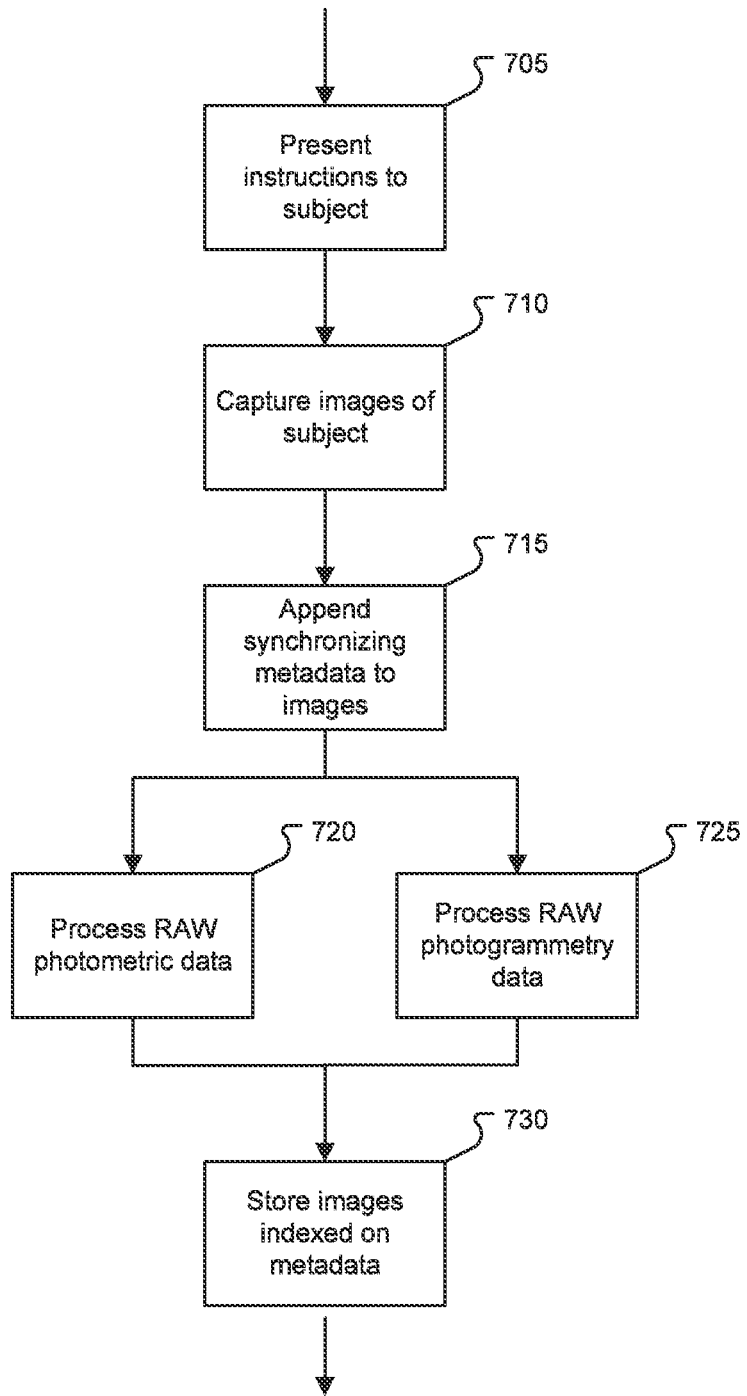
FIG. 7 is a flowchart illustrating an exemplary image capture process according to one embodiment of the present disclosure.

FIG. 7 is a flowchart illustrating an exemplary image capture process according to one embodiment of the present disclosure. As illustrated in this example, and based on the pipeline described above, the process can begin with presenting 705 a set of instructions to a subject. The instructions can define or describe movements and/or expressions for the subject to make. According to one embodiment, the set of instructions can be provided to the subject via an automated script that monitors the subject and proceeds from one instruction to a next instruction in response to detecting movements and/or expressions of the subject.

Images of the subject can be captured 710 while the subject is reacting to the set of instructions. Capturing 710 the images of the subject can comprise capturing a plurality of images of the subject under varying lighting conditions. As the images are captured 710, metadata can be appended 715 to the images. The metadata can substantially synchronize the images with the set of instructions.

Capturing 710 the images can comprise simultaneously capturing RAW photometric data and RAW photogrammetry data of the subject while the subject is reacting to the set of instructions. According to one embodiment, the RAW photometric data can be processed 720. Details of an exemplary process for processing 720 the RAW photometric data will be described below with reference to FIG. 8. Separately, and in some cases simultaneously, the RAW photogrammetry data can be processed 725. Details of an exemplary process for processing 725 the RAW photogrammetry data will be described below with reference to FIG. 9.

The images can then be stored 730 in a database. In doing so, the images can be indexed according to the appended metadata. In some cases, the database can comprise a secure database. Details of an exemplary process for storing and maintaining the images in such a secure database will be described below with reference to FIG. 10

Figure 8:
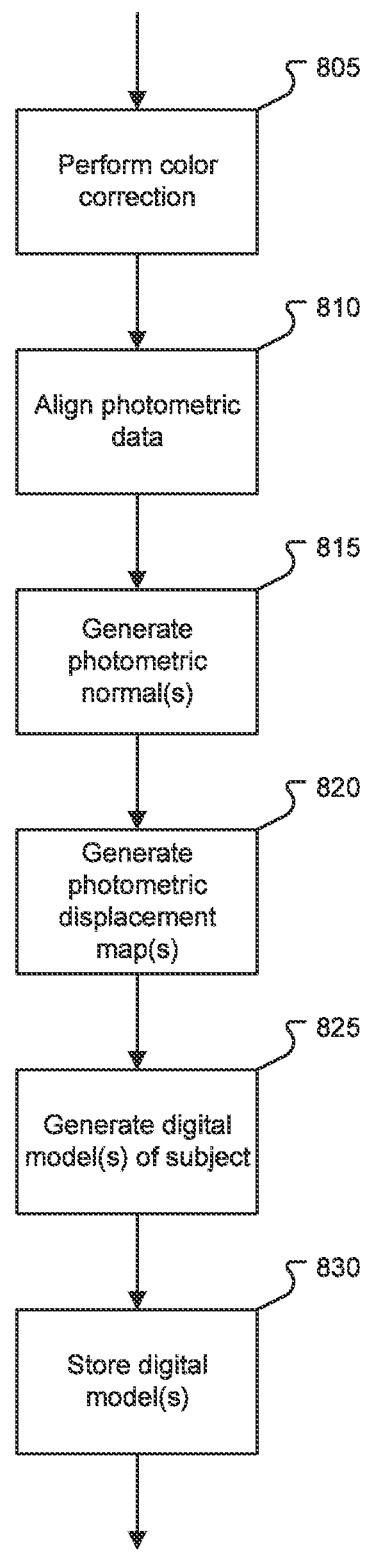
FIG. 8 is a flowchart illustrating additional details of an exemplary process for processing RAW photometric data according to one embodiment of the present disclosure.

FIG. 8 is a flowchart illustrating additional details of an exemplary process for processing RAW photometric data according to one embodiment of the present disclosure. As illustrated in this example, processing the RAW photometric data can begin with performing 805 a color correction on the RAW photometric data. The color correction process can comprise any of a variety of such processes as known in the art. The photometric data can then be aligned 810, i.e., to bring all of the images into a common reference system, and normalized, i.e., one or more photometric normal can be generated 815 to negate the effects of unintended variations between images. Processes for aligning 810 and normalizing 815 the photometric data can be any such processes as known in the art. One or more photometric displacement maps for surfaces represented in the images can be generated 820 using techniques as known in the art. Similarly, one or more digital models of the subject can be generated 825. The one or more digital models of the subject can then be stored 830 in the database.

Figure 9:
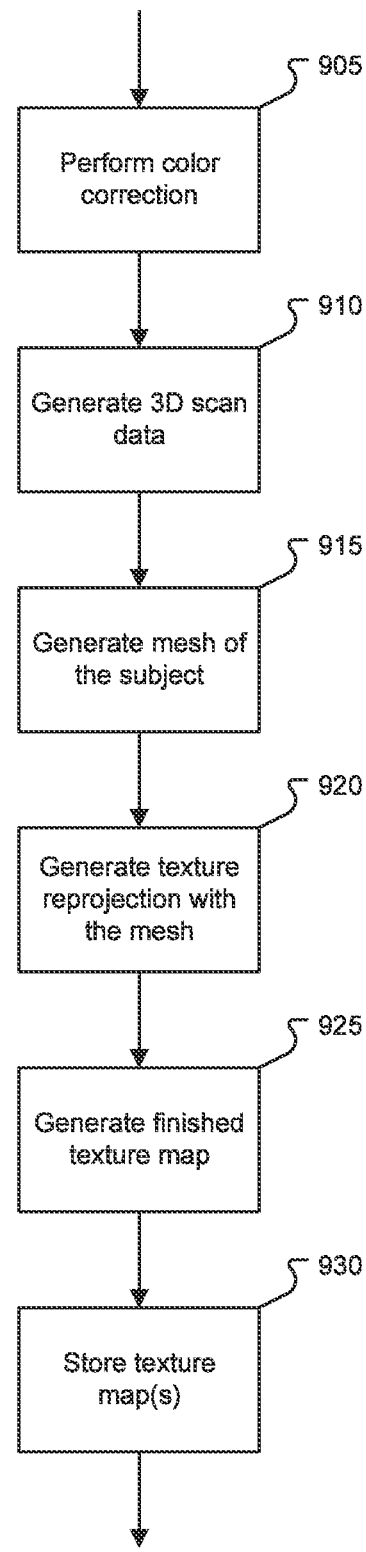
FIG. 9 is a flowchart illustrating additional details of an exemplary process for processing RAW photogrammetry data according to one embodiment of the present disclosure.

FIG. 9 is a flowchart illustrating additional details of an exemplary process for processing RAW photogrammetry data according to one embodiment of the present disclosure. As illustrated in this example, the process can begin with performing 905 a color correction on the RAW photogrammetry data. The color correction process can comprise any of a variety of such processes as known in the art. Also using processes as known in the art, RAW three-dimensional scan data can be generated 910 from the RAW photogrammetry data and a mesh of the subject can be generated 915 with the RAW three-dimensional scan data and a base mesh. A texture reprojection can then be generated 920 with the mesh of the subject, a finished texture map of the subject can be generated 925 based on the texture reprojection, and the finished texture map can be stored 930 in the database.

Figure 10:
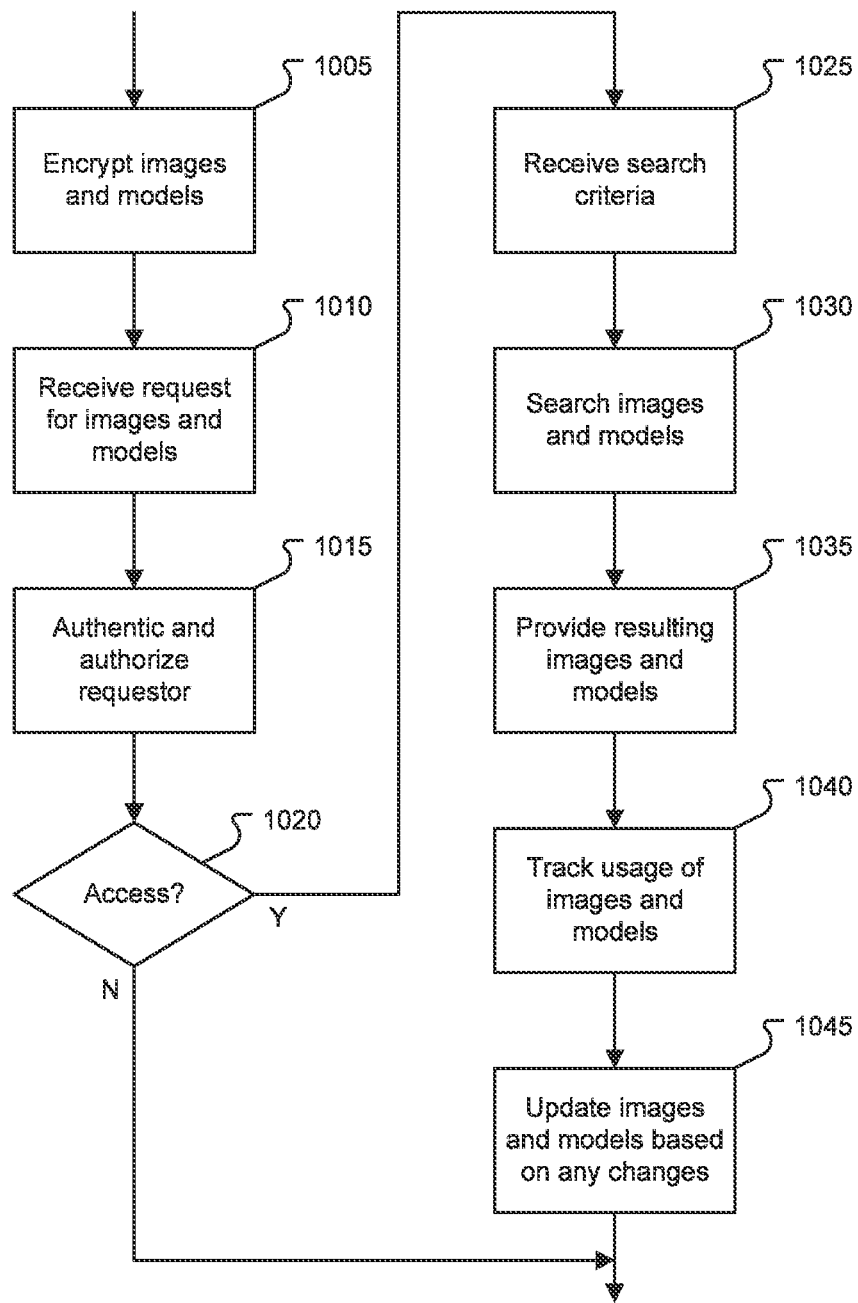
FIG. 10 is a flowchart illustrating an exemplary image storage process according to one embodiment of the present disclosure.

FIG. 10 is a flowchart illustrating an exemplary image storage process according to one embodiment of the present disclosure. As illustrated in this example, the process can begin with encrypting 1105 the images and models of the subject generated from the images to be stored in the database. At a later point in time, a request to retrieve the images and one or more models of the subject can be received 1010 and authentication and authorization processes can be performed 1015 on the request.

A determination 1020 can then be made based on the authentication and authorization processes as to whether to allow access to the images and models. In response to determining 1020 the authentication and authorization processes were successfully completed, search criteria for retrieving the images and one or more models of the subject can be received 1025 and the secure database can be searched 1030 for the images and one or more models of the subject based on the received search criteria. The images and one or more models of the subject can then be provided 1035 in response to the received search criteria. Usage of the provided images and one or more models of the subject can be tracked 1040 and the images and one or more models of the subject can be updated 1045 with any changes based on the tracking of the usage of the images and one or more models of the subject.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for processing images, the method comprising:

presenting, by at least one processor of a plurality of processors of a distributed computing environment, a set of instructions to a human subject, the instructions defining movements and/or expressions for the human subject to make;

capturing, by the at least one processor, images of the human subject while the human subject is reacting to the set of instructions under varying light conditions, wherein capturing the images comprises simultaneously capturing both RAW photometric data of the human subject and RAW photogrammetry data of the human subject while the human subject is reacting to the set of instructions;

attaching, by the at least one processor, metadata to the images as the images are captured, the metadata substantially synchronizing the images with the set of instructions; and storing, by the at least one processor, the images in a database, wherein the images are indexed according to the metadata attached thereto, thereby causing the images to be stored according to the synchronization thereof.

2. The method of claim 1, wherein the set of instructions are provided to the human subject via an automated script that monitors the human subject and proceeds from one instruction to a next instruction in response to detecting movements and/or expressions of the human subject.

3. The method of claim 1, wherein capturing the images of the human subject comprises capturing a plurality of images of the human subject under varying lighting conditions.

4. The method of claim 1, further comprising:
performing, by the at least one processor, a color correction on the RAW photometric data;
aligning, by the at least one processor, the photometric data;
generating, by the at least one processor, one or more photometric normals;
generating, by the at least one processor, one or more photometric displacement maps;
generating, by the at least one processor, one or more digital models of the human subject; and
storing, by the at least one processor, the one or more digital models of the human subject.

5. The method of claim 1, further comprising:
performing, by the at least one processor, a color correction on the RAW photogrammetry data;
generating, by the at least one processor, RAW three-dimensional scan data;
generating, by the at least one processor, a mesh of the subject with the RAW three-dimensional scan data and a base mesh;
generating, by the at least one processor, a texture reprojection with the mesh of the human subject; and
generating, by the at least one processor, a finished texture map of the human subject based on the texture reprojection.

6. The method of claim 1, wherein the database comprises a secure database and wherein storing the images in the secure database further comprises:
encrypting the images and one or more models of the human subject generated from the images;
receiving a request to retrieve the images and one or more models of the human subject; and
performing authentication and authorization processes on the request.

7. The method of claim 6, further comprising, in response to successful completion of the authentication and authorization processes:
receiving search criteria for retrieving the images and one or more models of the human subject;
searching the secure database for the images and one or more models of the human subject;
providing the images and one or more models of the human subject in response to the received search criteria;
tracking usage of the images and one or more models of the human subject; and
updating the images and one or more models of the human subject with any changes based on the tracking of the usage of the images and one or more models of the human subject.

8. A system, comprising:
a camera configured to capture images of a subject during an image-capture session; and
two or more compute units, each compute unit comprising a processor and a memory, the memory of each compute unit storing instructions which, when executed be the processor of the compute unit, causes the compute units to collectively process images captured by the camera in a distributed manner by:
presenting a set of instructions to a human subject, the instructions defining movements and/or expressions for the human subject to make;
capturing the images of the human subject while the subject is reacting to the set of instructions under varying light conditions, wherein capturing the images comprises simultaneously capturing both RAW photometric data of the human subject and RAW photogrammetry data of the human subject while the human subject is reacting to the set of instructions;
attaching metadata to the images as the images are captured, the metadata substantially synchronizing the images with the set of instructions; and
storing the images in a database, wherein the images are indexed according to the metadata attached thereto, thereby causing the images to be stored according to the synchronization thereof.

9. The system of claim 8, wherein at least one of the two or more compute units is provided in the camera.

10. The system of claim 8, wherein a first of the two or more compute units processes a first portion of an image of the human subject taken at a first time and wherein a second of the two or more compute units processes a second portion of the image of the human subject taken at the first time.

11. The system of claim 8, wherein at least one of the two or more compute units comprise an input optimizer and a process optimizer.

12. The system of claim 11, wherein the input optimizer comprises an image analyzer and a feed multiplexer.

13. The system of claim 11, wherein the process optimizer comprises a four dimensional model reconstruction module that uses the RAW photogrammetry data to generate one or more texture maps for models of the human subject.

14. The system of claim 8, wherein at least one of the two or more compute units comprise a physical compute unit and where at least another of the two or more compute units comprise a virtual compute unit.

15. The system of claim 8, wherein each of the two or more compute units are coordinated by a centralized controller.

16. The system of claim 8, wherein outputs of the two or more compute units are used to generate a digital model of the human subject.

17. The system of claim 16, wherein the digital model of the human subject comprises a three-dimensional model of the human subject generated with images stored in an indexed manner and wherein each of the two or more compute units are configured to apply a common indexing to the images.

18. A non-transitory, computer-readable medium comprising a set of instructions stored therein which, when executed by one or more processors of a distributed computing environment, causes the one or more processors to process images by:
   presenting, by at least one processor of a plurality of processors of a distributed computing environment, a set of instructions to a human subject, the instructions defining movements and/or expressions for the human subject to make;
   capturing, by the at least one processor, images of the human subject while the human subject is reacting to the set of instructions under varying light conditions, wherein capturing the images comprises simultaneously capturing both RAW photometric data of the human subject and RAW photogrammetry data of the human subject while the human subject is reacting to the set of instructions;
   attaching, by the at least one processor, metadata to the images as the images are captured, the metadata substantially synchronizing the images with the set of instructions; and
   storing, by the at least one processor, the images in a database, wherein the images are indexed according to the metadata attached thereto, thereby causing the images to be stored according to the synchronization thereof.

19. The non-transitory, computer-readable medium of claim 18, wherein:
   the RAW photometric data and the RAW photogrammetry data are processed separately;
   processing the RAW photometric data comprises:
      performing a color correction on the RAW photometric data, aligning the photometric data,
      generating one or more photometric normals,
      generating one or more photometric displacement maps,
      generating one or more digital models of the human subject; and
      storing the one or more digital models of the human subject; and
   processing the RAW photogrammetry data comprises:
      performing a color correction on the RAW photogrammetry data,
      generating RAW three-dimensional scan data,
      generating a mesh of the subject with the RAW three-dimensional scan data and a base mesh,
      generating a texture reprojection with the mesh of the subject, and
      generating a finished texture map of the human subject based on the texture reprojection.

* * * * *